United States Patent [19]

Cookson

[11] E Re. 28,776

[45] Reissued Apr. 20, 1976

[54] FRANGIBLE ELEMENTS IN SHEET MATERIAL

[75] Inventor: William Cookson, Fareham, England

[73] Assignee: Cookson Sheet Metal Developments Limited, Southampton, England

[22] Filed: Oct. 7, 1974

[21] Appl. No.: 513,036

Related U.S. Patent Documents

Reissue of:

[64] Patent No.: 3,698,590
Issued: Oct. 17, 1972
Appl. No.: 156,294
Filed: June 24, 1971

U.S. Applications:

[63] Continuation-in-part of Ser. Nos. 796,975, Feb. 6, 1969, and Ser. No. 28,880, April 15, 1970, which is a continuation-in-part of Ser. No. 796,975.

[30] Foreign Application Priority Data

| | | |
|---|---|---|
| Mar. 16, 1968 | United Kingdom | 7698/68 |
| Jan. 24, 1969 | United Kingdom | 4248/69 |
| Nov. 26, 1970 | United Kingdom | 56335/70 |
| Jan. 15, 1970 | Ireland | 58/70 |
| June 15, 1970 | United Kingdom | 28024/70 |
| Jan. 22, 1970 | Australia | 10545/70 |
| Dec. 7, 1973 | Germany | 2360982 |

[52] U.S. Cl. ..... 220/270; 220/273; 220/90.6

[51] Int. Cl.[2] ..... B65D 41/32

[58] Field of Search ..... 220/266, 270, 272, 273, 220/90.6; 222/541

[56] References Cited

UNITED STATES PATENTS

| | | | |
|---|---|---|---|
| 3,254,790 | 6/1966 | Dunn | 220/270 |
| 3,303,958 | 2/1967 | Taylor | 220/270 |
| 3,334,777 | 8/1967 | Smyth | 220/270 |
| 3,411,470 | 11/1968 | Fraze | 220/270 |
| 3,434,623 | 3/1969 | Cookson | 220/270 |
| 3,478,918 | 11/1969 | Zundel | 220/270 |
| 3,490,643 | 1/1970 | Henning et al. | 220/270 |

*Primary Examiner*—George T. Hall
*Attorney, Agent, or Firm*—Merriam, Marshall, Shapiro & Klose

[57] ABSTRACT

A frangible element or weakened line in sheet material, especially tinplate, which is useful in opening means for containers. A method and apparatus for making the line is described. The frangible element lies between two portions of the sheet of greater thickness than the frangible element, to which it is joined by rounded steps or other rounded formations, and a hollow indentation, e.g., a bead, lies in one of the portions. By using a series of indentations, these can be arranged so that the opening of a tear-open panel in the container wall can be controlled more easily.

25 Claims, 15 Drawing Figures

Fig. 1.
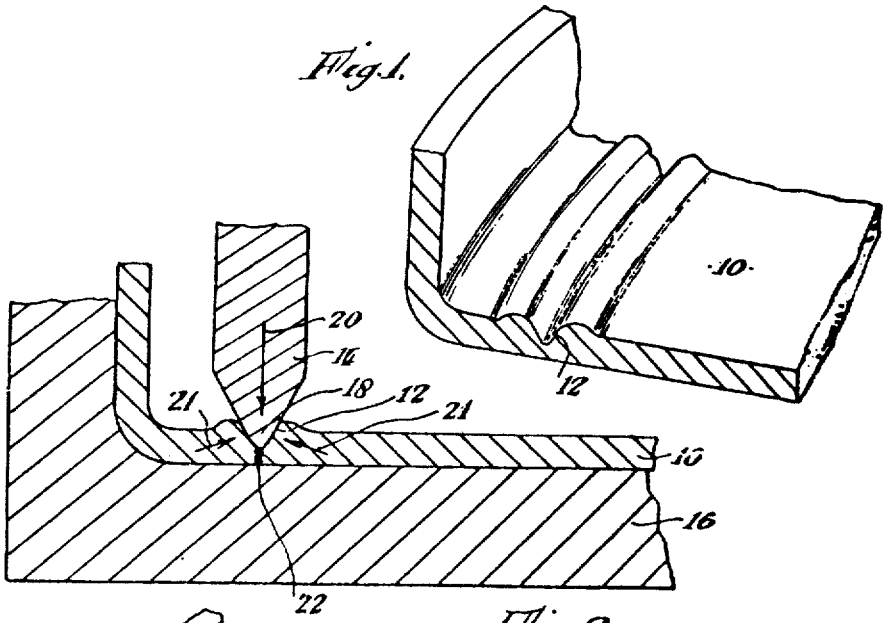
Fig. 2.
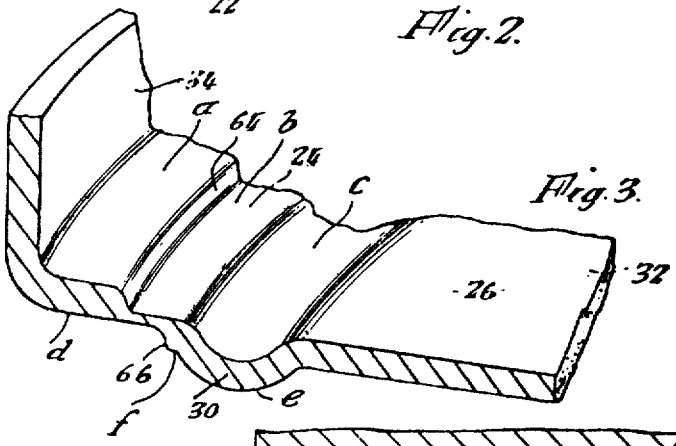
Fig. 3.
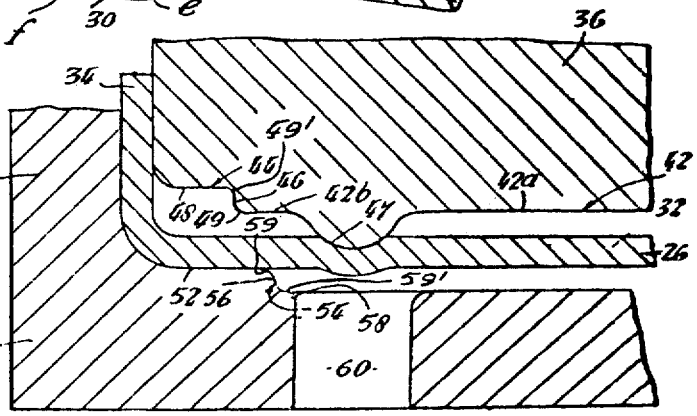
Fig. 4.

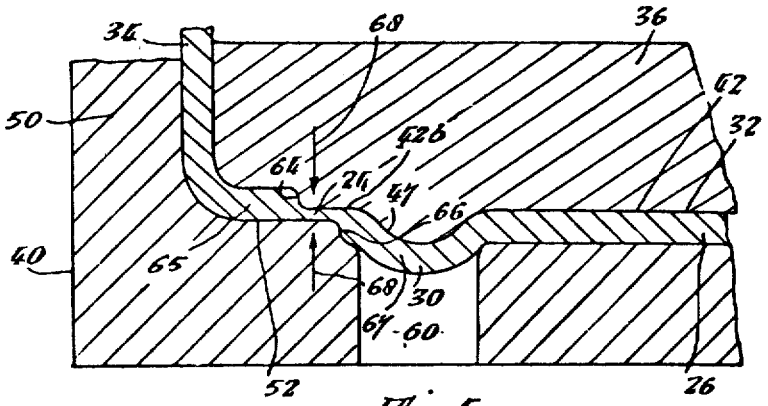
Fig. 5.
Fig. 6.
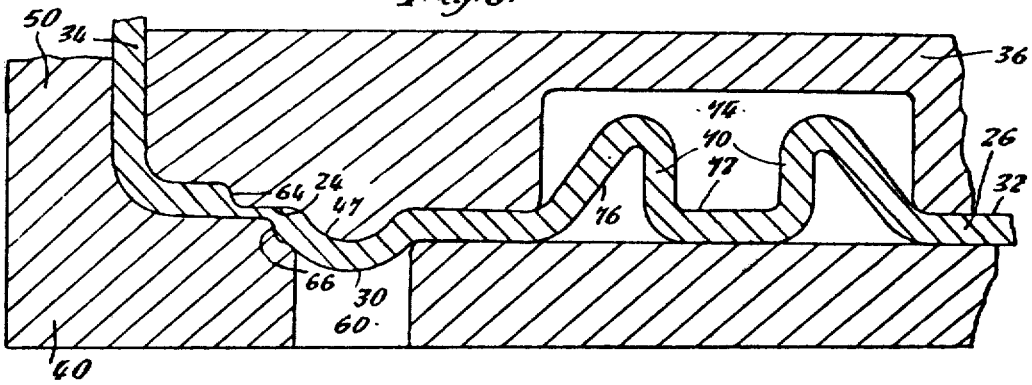
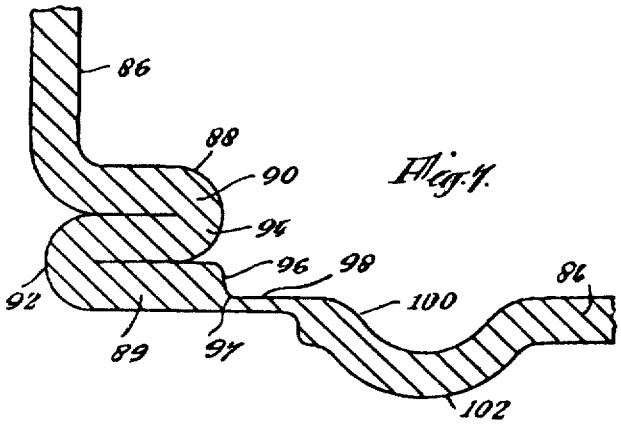
Fig. 7.

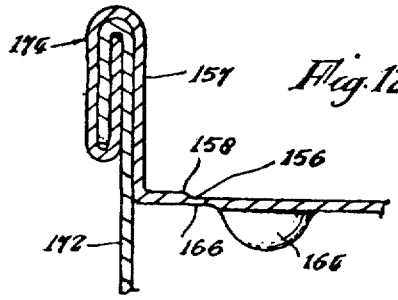
Fig. 12.
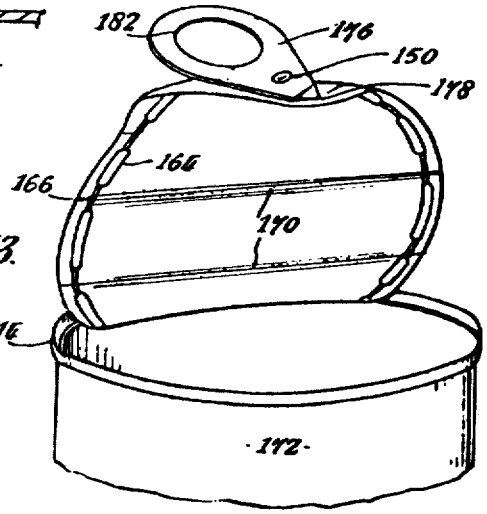
Fig. 13.
Fig. 15.
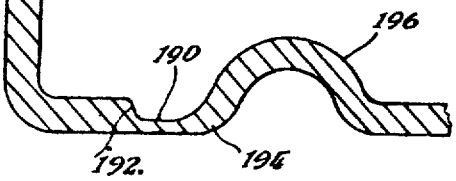
Fig. 14.
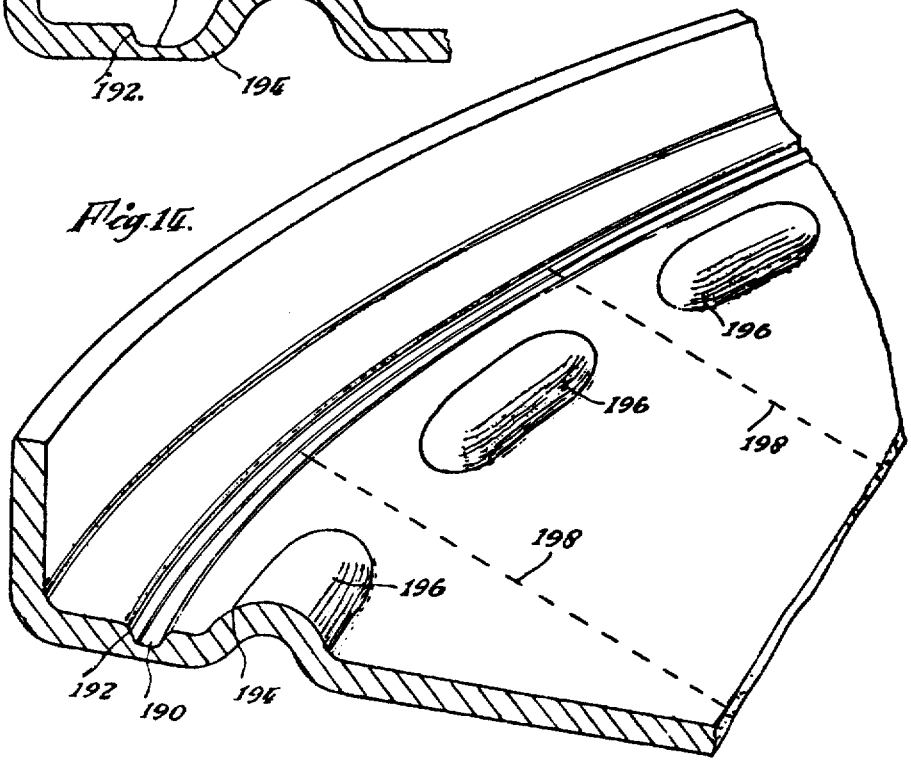

FRANGIBLE ELEMENTS IN SHEET MATERIAL

Matter enclosed in heavy brackets [ ] appears in the original patent but forms no part of this reissue specification; matter printed in italics indicates the additions made by reissue.

This application is a continuation in part of U.S. application Ser. No. 796,975 filed Feb. 6, 1969 and allowed Mar. 29, 1971 and of U.S. application Ser. No. 28,880 filed Apr. 15, 1970 and allowed Apr. 5, 1971, the latter application being itself a continuation in part of application Ser. No. 796,975.

This invention relates to sheet material, especially thin sheet material, provided with a frangible element. It further relates to containers including such sheet material, and to means for the easy opening of containers. It is particularly applicable to containers made of thin sheet material, for example tinplate, in which a portion of the material bordered by a weakened line is torn by hand from a wall or end of the container.

It is the usual practice to provide a weakened line in sheet metal by scoring, that is by pressing a top die having a sharpened edge on to a flat bottom die to partially cut through the sheet metal to leave a residual of metal of about 30 percent of the original thickness of the material.

As the displaced metal flows from each side of the scoring tool it forms inclined surfaces in the top portion of the metal causing compression stresses which are unbalanced between the top and bottom surfaces of the metal. In consequence, the stresses induce work hardening of the residual metal below the scoring tool which inhibits the metal flow and this can give rise to incipient cracks. Because of these factors it has been found difficult to maintain a scored line with a residual of the consistent depth necessary for the ready tearability of easy open lids particularly when these are made from tinplate.

Problems in maintaining the tooling arise particularly when scoring tinplate because the edge of the scoring tool requires replacing at frequent intervals as it becomes blunted by the impact of the tool on the surface of the tinplate supported by the bottom die.

When using tinplate the scoring process is often not deemed to be satisfactory as the scoring tool cuts through the coating of tin on the sheet metal which gives rise eventually to corrosion. To overcome this problem a coating of lacquer is usually applied to the material, which is an additional expense in manufacture.

It is an object of the present invention to provide sheet material having a weakened line or weakened portion especially sheet metal with a frangible element suitable for use in a container wall.

Another object is to provide sheet material having a frangible element which can be made with less likelihood of cracks forming in or adjacent the frangible element than has been the experience hitherto. Another object is to provide plated sheet material (for example tinplate) having such a frangible element which can be made in such a way as to avoid cutting through the plating. It is a further object to provide sheet material with a frangible element arranged to form a tear-open panel which can be controllably opened.

According to one aspect of the present invention sheet material which can be made in such a way as to overcome or assist in overcoming the formation of cracks and in such a way that the plating (if the material is plated) remains unbroken in and adjacent the frangible element is characterized by having a first portion, a rounded step in the top surface of the first portion of the sheet leading to a frangible element comprising material of smaller thickness than the first portion, a rounded formation in a surface of the sheet leading from the frangible element to a second portion of the sheet material, the second portion having a thickness greater than that of the frangible element and having formed therein at least one hollow indentation. As explained more fully in my co-pending patent application filed on the same day as this application, and entitled "Improvements in or relating to the manufacture of a frangible element in sheet material" such sheet material may be made by means of press tool dies, excess material from the thinned portion passing, during the pressing operation into the said second portion of the material.

The rounded formation may be a downward formation, an area of the second formation adjoining the thinned portion being planar except for a deformation therein formed between substantially parallel curved depressions in the surfaces close to the thinned portion.

The deformation in the second portion of the sheet may be a hollow bead adjoining the frangible element, and the rounded deformation may lead directly into the bead, for example, there may be a downward formation leading to a downwardly formed bead or an upward formation leading to an upwardly formed bead. Alternatively the rounded formation may be a step leading to a planar area, the bead or other indentation being adjacent to the frangible element but separated therefrom by the planar area.

In one of its aspects, sheet material according to the invention has sheet material having a first portion, a downward formation in the top surface of the sheet leading to a frangible element comprising material of smaller thickness than the first portion, the downward formation in the bottom surface of the sheet leading from the frangible element to a second portion of the sheet material, the second portion having a thickness greater than that of the frangible element and having formed therein a hollow bead close to the frangible element.

It is preferred that the thickness of the frangible element shall be less than half (and preferably about one-third or even less) of the thickness of the first and second portions of sheet material.

A principal use of sheet material having a frangible element is to provide a tear-open panel in a container wall. A container wall in one aspect of my invention is formed of sheet metal having a thinned portion of a width greater than its thickness comprising a frangible element bounding a tear-open panel, an elongate deformation in the tear-open panel extending alongside and close to the thinned portion comprising substantially parallel curves in the two surfaces of the tear-open panel. A handle is preferably secured to the tear-open panel of the wall so that the thinned portion can be ruptured and the tear-open panel lifted from the wall. To facilitate the rupture of the thinned portion, the handle may be hinged to allow initial downward puncture of the thinned portion on lifting the handle.

As already indicated, the hollow indentation of or indentations may be downwardly formed or upwardly formed. I have discovered that, if there is provided in the sheet material a series of hollow beads, these may be used to assist in opening a tear-open panel in a container wall.

Thus according to another aspect of this invention there is provided sheet material having a first portion, a downward formation in the top surface of the sheet leading to a frangible element comprising material of a smaller thickness than the first portion, a second portion of thickness greater than that of the frangible element joining the frangible element on the other side from the first portion, and a series of beads or indentations in the second portion. The sheet material may be used for a container wall, the frangible element forming part of opening means for the container wall and bordering a tear-open panel for the wall, the series of beads or similar shapes within the panel assisting in the controlled removal of the panel by means of an opening device, e.g., a handle secured to the tear-open panel by providing spaced areas of stiffening in the panel preferably parallel to the frangible element. In this aspect of the invention, when the frangible element is broken through and the tear-open panel pulled away, the sheet material bends along successive lines across the sheet between the beads to allow controlled removal of the panel.

In one form a single elongate bead is provided either close to or adjacent the frangible element, extending continuously for the whole or part of the length of the frangible element and a series of separate beads or indentations (preferably a series of beads parallel to the single elongate bead) is formed in the second portion on the opposite side of the single bead from the frangible element. The beads or indentations (including the elongate bead if present) may be formed upwardly or downwardly and need not all be formed in the same direction. The said separate beads may all be the same distance from the frangible element and may be equally spaced from one another. Where an elongate bead as aforesaid is downwardly formed a downward formation in the bottom surface of the material may lead from the frangible element into the elongate bead. In a very similar manner, if the elongate bead is upwardly formed, an upward formation may lead from the frangible element into the elongate bead.

In another form of the invention in place of an elongate bead a series of beads is formed close to the frangible element. If these beads are formed downwardly, a downward formation in the bottom surface of the material at the edge of the frangible element may be formed by the series of beads, and between the beads a downward step in the material. If the beads are formed upwardly an upward formation may lead from the frangible element into the outer surface of each bead.

The beads or indentations in the sheet material may be so arranged as to give in the material a plurality of substantially parallel lines of low resistance to flexing separated by areas of relatively high resistance to flexing.

When the sheet material is made up into a container wall for the purpose of allowing the frangible element to be broken through by suitable means to bend back a portion of the material defined by the frangible element, the series of beads or indentations may be so positioned that the act of bending back the portion of material causes the sheet material to bend along successive lines across the sheet between the beads or indentations. This enables a greater control to be exercised over the bending operation.

In the description with reference to the drawings the invention is exemplified as applied to tinplate and it is with this material and other plated materials particularly that the advantages of the invention are obtained. However the claims are not limited to the use of tinplate as the sheet material, because the invention is applicable to other materials.

Various forms of this invention will be described with reference to the accompanying drawings in which:

FIG. 1 illustrates in part perspective a weakened line made in sheet metal by scoring means of a type employed prior to the present invention;

FIG. 2 illustrates in part cross-section view dies for providing a scored line in sheet metal as shown in FIG. 1;

FIG. 3 illustrates in part perspective view a weakened line or frangible element in sheet metal according to the present invention;

FIG. 4 illustrates in fragmentary cross-section view dies for forming the weakened line or frangible element shown in FIG. 3, in the open position;

FIG. 5 illustrates in fragmentary cross-section view the dies shown in FIG. 4 in the closed position;

FIG. 6 illustrates in fragmentary cross-section view a view similar to that of FIG. 5 showing a recessed top die;

FIG. 7 illustrates in fragmentary cross-section view means for reinforcing a thinned portion;

FIG. 12 illustrates a part cross-section through a sheet metal container having a lid consisting of a sheet metal member such as shown in FIG. 11, the section being taken along one of the lines 170 of FIG. 11;

FIG. 13 illustrates in perspective view a panel of the lid shown in FIG. 12 being removed from the container.

FIG. 14 is part perspective view showing a weakened line or frangible element in sheet metal with a series of upwardly formed beads; and FIG. 15 is a part cross-section similar to FIG. 14 but showing the series of beads closer to the frangible element.

Figure 8:
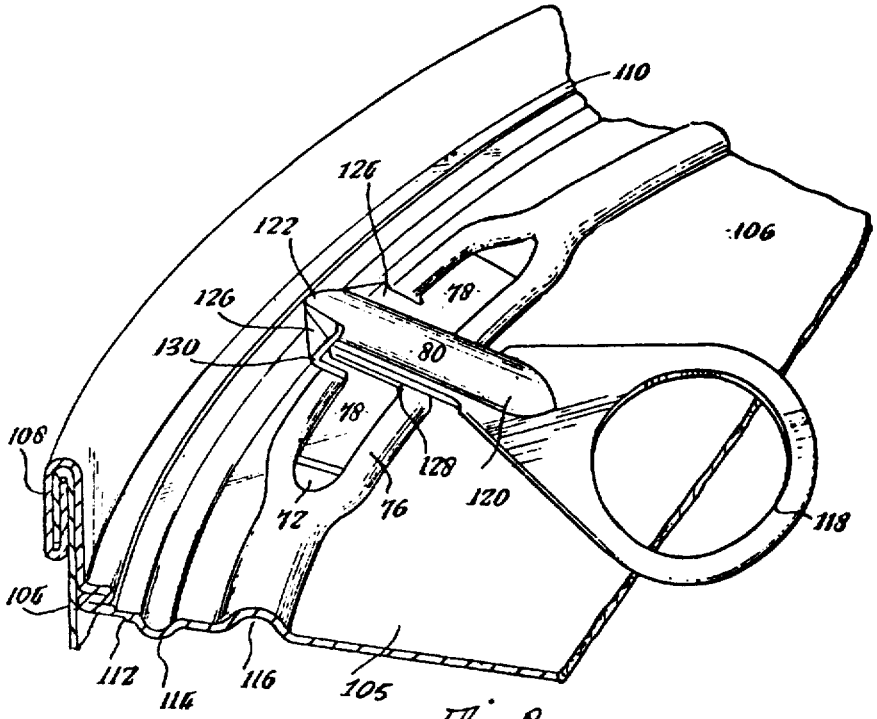
FIG. 8 illustrates in part perspective view a preferred form of opening device for a container lid using a frangible element similar to that shown in FIG. 7.

In FIG. 1 is shown a lid 10 of, for example, a container made of sheet metal having a weakened line 12 made by scoring or partially cutting through the metal in accordance with a previous method.

FIG. 2 illustrates the dies used to make the scored line 12 in FIG. 1. The sheet metal lid 10 is located between a scoring tool 14 and an anvil 16 with the sharp edge 18 of the scoring tool 14 entering into the sheet metal. Penetration of the metal by the scoring force 20 is resisted by compressive stresses 21 in the top portion of the metal. The displaced metal forms inclined surfaces in the top of the metal on each side of the scoring tool resulting in unbalanced stresses between the top and bottom surfaces of the metal so causing failure in the form of cracks, 22.

In FIGS. 3, 4, and 5 there is shown in accordance with the present invention an article and a method and apparatus for making it, the article comprising a sheet metal container wall 26, in this instance a tinplate lid, having a weakened line or frangible element 24. The frangible element 24 bounded by steps forms part of an extrusion in the metal, the formation of which is subsequently described, the extrusion defining a tear-open geometric pattern (surrounding a tear-open panel) and being, in this example, annular in plan. The frangible element 24 is in the form of a thinned portion of the metal constituting an area of thickness smaller than the general, substantially uniform, thickness of the container wall 26, and is elongated inwardly from the peripheral bounds of the geometric pattern, having a controlled cross-section of essentially constant thickness.

In FIGS. 3, 4, and 5 the annular frangible element 24 is made by pressing an annular portion of the metal which with an annular hollow bead 30 bounds a central area 32 of the lid 26. The lid which has a rim 34 before making the weakened line, is shown in open press tool dies in FIG. 4. The dies are made from suitable tool material and they comprise a top die 36 and a bottom die 40. The dies 36 and 40 are generally circular. A part of the left-hand side only of the dies is shown in FIGS. 4 and 5 along a radial section line. The shape towards the center of the dies may be modified as shown in FIG. 7 subsequently described.

Top die 36 has a flat surface 42 comprising two concentric areas 42a, 42b separated by a projection in the form of a bead 47. The top die has a raised stepped edge portion 44 including a step 46 and a flat surface 48. The step 46 has rounded edges 49,49' where it joins the surfaces 42b, 48. A step joining surfaces through curved or rounded edges in dies or sheet material is referred to in this description and the claims as a rounded step. Such steps between the curved or rounded edges may be perpendicular to the surfaces they join or inclined to one or both of them. Surfaces 48 and 42b which are parallel comprise respectively top and bottom work-contacting surfaces for the top die separated by the rounded step 46 and surrounding a central area of the die.

Bottom die 40 comprises a rim portion 50 and a flat portion 52 constituting a work-contacting surface which extends inwardly of rim portion 50 to an edge or step 56 from where on the bottom die is relieved to allow downward displacement of the sheet material. In detail, adjacent flat portion 52 is provided a stepped portion 54 and a recess 60. The stepped portion 54 comprises a rounded step 56 and a ledge 58 underlying the flat surface 42b of top die 36. Step 56 joins surfaces 52, 58 through rounded edges 59, 59'. Ledge 58 comprises a further (bottom) work-contacting surface for the bottom die separated by the step 56 from the (top) work-contacting surface 52 and with it surrounding a central area of the bottom die. Flat portion 52 and ledge 58 are parallel to each other and to surfaces 48 and 42b. Adjacent to the ledge 58 of stepped portion 54 is provided the recess 60. It will be observed that the bead 47 of the top die is opposite the recess 60, i.e., at a position to register with the recess for the purpose subsequently explained. It should be understood that the designations "top" and "bottom" in relation to the dies described and claimed herein are not intended to indicate that one die will always be used vertically above the other. Any suitable orientation of the dies may be used. The designations "top" and "bottom" in relation to the surfaces of the sheet metal should be similarly understood.

Referring to FIG. 4, as the top die 36 moves towards the bottom die, the bead 47 initiates a deformation in the sheet metal in the shape of a shallow curve at the point where the bead impinges on the metal. Subsequently as the dies close further, (FIG. 5) the top die 36 cooperates with the bottom die 40 to complete the formation of the substantially part-circular bead 30 from this deformation and to displace parts of the sheet metal to different planes and to form a thinned portion 24 or frangible element between work-contacting surfaces 42b and 52. It will be seen that a part of the top surface of the material is displaced by the dies towards an opposite side of the sheet and a part of the bottom surface of the sheet is displaced in the same direction. Edges 64, 66 of the two displaced parts are separated with the thinned portion 24 in between. A downward formation in the shape of a rounded step 64 is produced in the top surface of the sheet leading from a first portion 65 of the sheet to the thinned portion 24 which is in a plane parallel to the first portion 65 and of smaller thickness than the said portion. A downward formation or depression in the shape of a rounded step 66 is also formed in the bottom surface of the sheet leading from the thinned portion to a second portion 67 of thickness greater than the thinned portion. Steps 64 and 66 are formed in the same direction and are spaced from each other with the frangible element 24 between them. These steps correspond to the step 46 in the top die and the step or edge 56 in the bottom die, which, as shown, are spaced apart in the closed position of the dies.

In the pressing operation, the bead 47 of top die 36 presses the sheet metal of the lid 26 into recess 60 of bottom die 40, drawing metal down into the recess while a portion of flat surface 42b of top die 36 compresses and thins the sheet metal against the flat portion 52 of bottom die 40 over the area of overlap between these two work-contacting surfaces. The thinned area comprises the weakened line or frangible element 24 its edges being defined by steps 64 and 66. Step 66 lies inwardly of step 64 substantially parallel thereto. The width of the frangible element 24 is substantially constant and is greater than its thickness. The steps are annular in form as is the frangible element. The formation of the thinned portion 24 and the bead 30 may be considered as an inward extrusion of the material between the dies, the final shape of which is controlled by the shape of the dies. The inward movement of the material is facilitated by the rounded edges 49, 49', 59, 59' of the steps in the dies which assist and control the flow of the material. This flow of material and the means for producing it are quite different from scoring as above described and are also quite different from semi-shearing in which metal is partially cut through or sheared by use of sharp cornered tools, which moreover do not compress a portion of metal to thin it.

Referring to FIG. 3, the metal sheet in the region of the extrusion is seen to have on the top surface first and second surface elements a and b in different planes joined by a step 64 (corresponding to the top die surfaces) and a curved surface element c adjacent the second said element directed away from the plane of the first element a. On the bottom surface the metal sheet has (corresponding to flat portion 52 of the bottom die) a plane surface element d opposite the first surface element a and the step 64 and also opposite at least part of the second surface element b and a curved surface e opposite and substantially parallel to the curved surface c on the top surface of the sheet, the distance between the first surface element a and the plane surface element d exceeding the distance between the second surface element b and the plane surface element d. The plane surface element d joins the lower curved surface e by a step 66 directed away from the plane of the second surface element b, and a ledge f. Drawing the sheet metal to form bead 30 from the area of the frangible element 24 assists in accommodating the excess metal which freely flows inwardly in the dies from the thinned area to produce a deformation in the lid in a controlled manner. If the deformation was not initiated by the projection in the die 36, there would be a danger of it taking place at random across the lid producing undesired buckling. The thickness of the metal in the area of the bead 30 between the curves c and e remains substantially the same during the process of deformation.

While it is not desired to be bound by theory it is believed that the compression stresses 68 (FIG. 5) are equally balanced between the top and bottom surfaces of the sheet metal so the displaced metal can flow in equilibrium between the dies into the bead 30 without any or with reduced risk of work hardening the thinned metal so avoiding or reducing the risk of cracking. The method and apparatus facilitate the production of a consistently accurate depth of residual material in the lid or other container wall which ensures that this can always be readily and easily opened by the user by use of suitable means, e.g., as subsequently described. The residual thickness is preferably less than half the general lid thickness. For tinplate lids 0.009 ins. thick the residual material is preferably approximately one-third this thickness, i.e., 0.003 ins. thick. The residual depth can be varied according to the characteristics of the material.

Repeatable accuracy of depth of the frangible element is obtained over very large production runs as the flat work-contacting surfaces maintain their shape and form. This overcomes the disadvantage arising from prior art scoring processes where constant impact of the scoring tool on the anvil causes the tool to become blunt.

In a modification of the dies shown in FIGS. 3 to 5, the step 56, rounded at 59, leads downwardly directly into a recess similar to recess 60, the work-contacting surface 58 being omitted. A step similar to step 64 is thereby formed in the upper surface of the sheet material while on the bottom surface, a depression is formed in the recess adjoining the thinned portion or frangible element. This depression provides the lower surface of a bead which is formed in the recess by a cooperating bead in the top die.

Referring now to FIG. 6 there is shown a section through dies and a lid generally similar to the dies shown in section in FIG. 5, like parts being indicated by like numerals. The section is taken along a line where upstanding triangular shaped ears 70 for use subsequently as securing means have been formed in the central area 32 of the lid 26 prior to its entry into dies 36, 40. The triangular shaped ears extend generally parallel to the rim 34 of the lid 26 preferably along an arcuate line inwardly of and parallel to a part of the circumference of the lid. The ears have a channel 72 between them which is intended to receive fixing tabs of a handle used in opening means for the container. A recess 74 in top die 36 provides a clearance right around the lid to clear channel 72 and a bead similar to bead 116 subsequently described with relation to FIG. 8.

In the present example it is convenient to form the ears 70 in the blank prior to making the frangible element to avoid breaking the element in a subsequent forming operation. The ears may be used to make a folded connection 76 described later in relation to FIG. 8 by placing tabs 78 of an opening device 80 into the channel 72 and bending down the ears over the tabs while holding the remainder of the lid in suitable clamps.

In FIG. 7 is shown a form of reinforcement for a can end make, for example, of tinplate formed adjacent a thinned weakened portion or frangible element 98. A lid 84 has in the base of its rim 86 a reinforced edge 88 comprising two layers of material overlying the material 89 adjacent the thinned portion 98, the layers being joined to each other and to the material 89 through reversed bends 90 and 92. Bend 90 provides adjacent one of the rounded steps 96 which bounds the thinned portion a shoulder 94 against which can be broken an edge 97 of the thinned portion. Shoulder 94 also provides a safe edge for the inside of the container when the removable portion 100 of the lid has been removed. A bead 102 is provided as previously explained.

In FIG. 8 is shown a preferred form of opening device for opening a lid of a container. A handle 118 is secured to a tear open portion 105 of the lid 106 bounded by a frangible element 112 whereby the frangible element may be ruptured and the tear open portion lifted from the wall. In the figure, a container body 104, a lid 106 and an opening device 80 are all preferably made from tinplate although other materials such as aluminum can equally well be used. Lid 106 is joined to body 104 by a seamed joint 108. Use of tinplate for both body and lid is advantageous from the point of view of cost. Lid 106 is provided with a reinforced shoulder 110 similar to shoulder 94 above described and a thinned portion or weakened line 112 to provide a frangible element which is formed in a manner similar to that above described. A folded connection 76 provided in the material (see also FIG. 6) secures tabs 78 of the opening device 80 to the lid. The folded connection may be made by clenching downwardly triangular shaped ears formed in the blank prior to pressing the weakened line as above described with reference to FIG. 6. The lid has an annular bead 114 similar to the beads 30 and 102 previously described in relation to FIGS. 3 and 7, and a stiffening bead 116.

The opening device 80 comprises a tab handle 118 including a ring and a stiffening bead 120 provided with a nose portion integrally connected to tabs 78 by a hinge portion 124. In the initial inoperative position of the tab handle in which it lies substantially parallel to that of the lid, the nose portion 122 is located above and inwardly of the thinned portion or frangible element 112 spanning the bead 114. The nose portion 122 is reinforced by folding corners 126 over hinge portion 124 as shown in FIG. 8. Slits 128 one each side of bead 120 allow bead 120 to be lifted by handle 118 so that the hinging can take place and the overlying corners 126 serve to prevent tearing of the metal along the lines of slits 128 beyond the edges 130 as the handle 118 is lifted. The reinforcement which the corners 126 provide does not increase the overall height of the opening device and therefore allows the container lids with their opening devices to be nested prior to assembly on container bodies.

Figure 9:
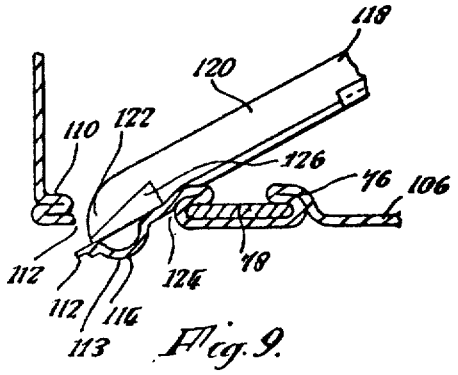
FIG. 9 illustrates in fragmentary cross-section view the container lid shown in FIG. 8 being opened.

In FIG. 9 the handle 118 is shown lifted to its operative position with nose portion 122 hinging downwardly and breaking through or puncturing a portion of the frangible element 112 so as to bend down an underlying portion 113 of the lid. The handle with its securing means is then upwardly pulled out of the original plane of the lid to fracture through on each side of the initial puncture the remainder of the frangible element 112 against the shoulder 110 so lifting and removing the portion 105 of the lid inwardly of the element 112 from the container. In tinplate, the lid is preferably so constructed that as the removable portion is lifted by the handle the shearing of the remainder of the frangible element on each side of the original puncture point proceeds with a minimum amount of bending of the removable portion taking place. It will be understood that this preferred process is different from the action in tear-off containers previously proposed in which a scored line is progressively torn through to peel off from the container a removable portion of the lid which bends appreciably in the process.

In opening means using a frangible element made by the means herein described, a handle may be secured to a removable portion of the container wall by means other than those above described, e.g., by riveting, welding or other securing means.

Figure 10:
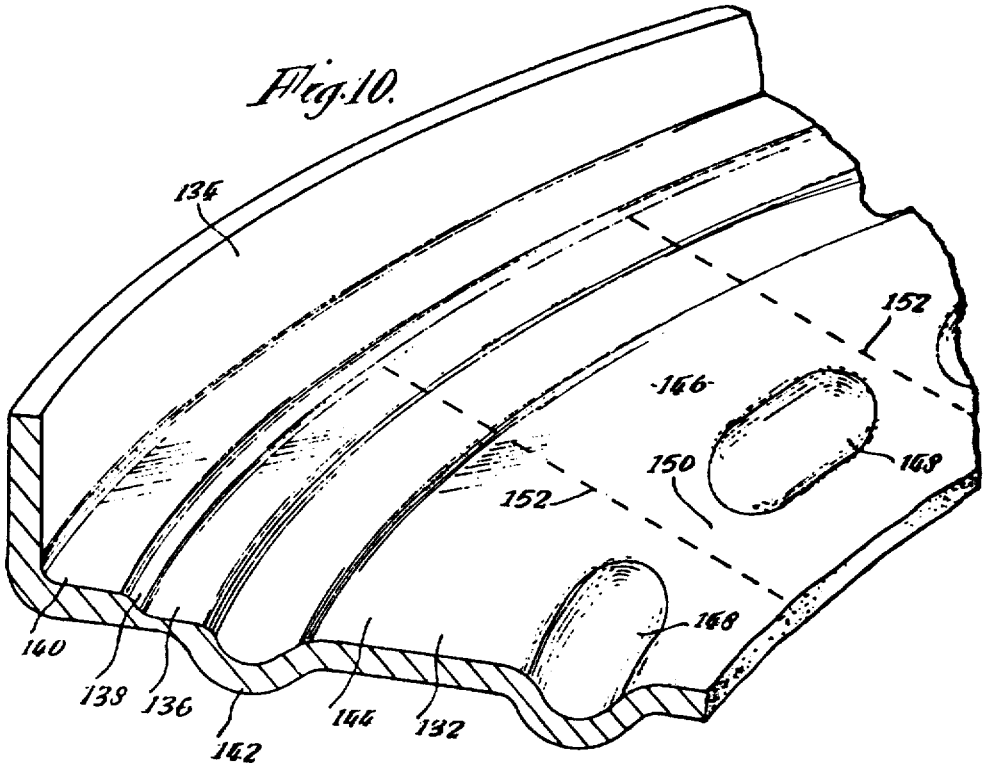
FIG. 10 illustrates in part perspective view a weakened line or frangible element in sheet metal according to the present invention with intermittent beads adjacent to a first bead.

In FIG. 10 there is shown a sheet container wall 132 made of tinplate having a rim portion 134 and weakened line or frangible element 136. The frangible element 136 is bounded on one side by an upward formation in the form of a step 138 leading to a first portion 140 of the container wall and on the other side by a downward formation in the other surface of the metal leading to a second portion 144, the downward formation being in the form of the under surface of a hollow bead 142. The frangible element 136 defines a tear-open geometric pattern surrounding a tear-open panel 146 and is in this example annular in plan. The frangible element 136 is in the form of a thinned portion of the metal constituting an area of thickness smaller than the general, substantially uniform thickness of the container wall 132 and is elongated inwardly from the peripheral bounds of the geometric pattern represented by the step 138, having a controlled section of constant thickness.

The annular frangible element 136 is bounded on the inward side by the bead 142 or some such similar shape. The bead is downwardly formed in the present example but a bead or similar shape may be upwardly formed in other examples. The bead or other shape is so dimensioned that its configuration takes up the excess metal which flows from the frangible element 136 when the metal is thinned to form the weakened line in suitable press forming dies.

Close to the bead 142 is provided in the tear-open panel 146 a series of downwardly directed bead formations or indentations 148 with a space providing flat portions 150 between the extremities of the beads 148. Alternatively the beads 148 may be upwardly formed. The beads 148 may be suitably spaced all round the tear-open panel or partly round it adjacent to an opening device, e.g., in the form of a handle (not shown) for removing said tear-open panel 146.

The beads 148 are formed at the same time as the bead 142 and the formation of the beads by a pressing operation is preferably initiated before the pressing of the element 136 and is continued at the same time as this element is thinned. It has been found that, when this the illustrated sheet container wall is formed by a pressing operating in this way, the element 136 can be brought to its thinned-out condition shown without any production of cracks and without any rupture of the tin surface.

The purpose of the beads 148 apart from assisting to take up excess metal from the thinned portion is to provide control means for assisting the removal of the tear-open panel to avoid contents, especially any liquid contents of the container, from spilling, as can happen when a tear-open panel is too quickly removed. Beads 148 intermittently stiffen the parts of the panel so that when said panel is torn out of the container by fracturing frangible element 136 the surface of the panel bends slightly in a series of hinge-like movements across flat portions 150 along bend lines (shown by dotted lines 152) extending across the panel between successive pairs of beads on either side of the panel. The beads 148 provide the desired control without increasing the depth of the lid which is an important factor from the viewpoint of mass production techniques.

The thickness of the metal may be reduced to less than one half in making the frangible element 156. In tinplate the residual thickness may conveniently be about one third the original thickness of the sheet. By way of example only, for tinplate of thickness 0.009 in. the depth of the residual metal in the frangible element may be 0.003 ins. and the width of the frangible element may be 0.002 ins., the width of metal as a whole which has been thinned to below the original thickness being, because of the sloping nature of the upward and downward formations 138 and 142 on either side of the frangible element, of a width greater than the width and also greater than the thickness of the frangible element. The curves joining the frangible element to the upward and downward formations in this example may be of 0.004 ins. radius.

Figure 11:
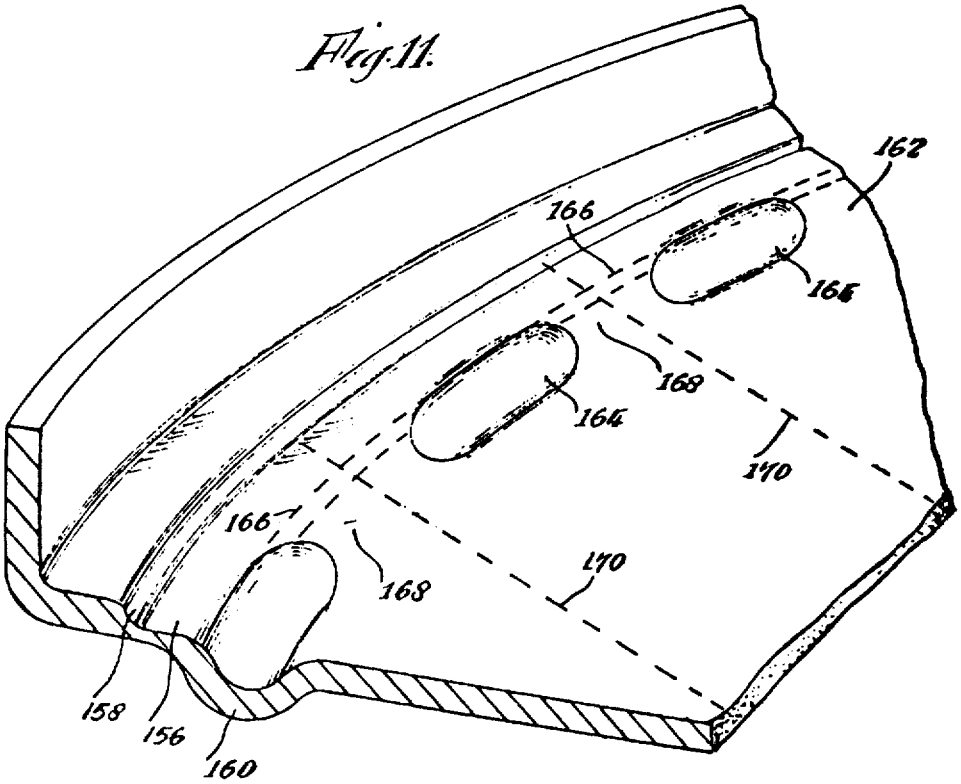
FIG. 11 illustrates in part perspective view a weakened line or frangible element in sheet metal with a series of intermittent beads adjacent to the frangible element.

FIG. 11 shows alternative means for controlling the rate of opening of a tear-open panel. A sheet container wall 154 made of tinplate having a rim portion 157 is provided with a weakened line or frangible element 156. The frangible element 156 is bounded by an upward formation in the form of a step 158 on one side and by a downward formation 160 in the opposite surface of the metal on the other side and forms part of an extrusion in the metal defining a tear-open panel 162. The frangible element 156 is in the form of a thinned annular portion of the metal constituting an area of thickness smaller than the general, substantially uniform thickness of the container wall 154 and is elongated inwardly from the peripheral bounds 158 of the frangible element 156 having a controlled section of constant thickness.

The downward formation 160 is constituted by a series of downwardly directed separate beads or indentations 164 or some such similar shapes and by separate step formations 166 in the underside of the metal linking the beads 164. The beads are so dimensioned that their configurations take up the excess metal which flows from the frangible element 156 when this is made in suitable press forming dies. Spaces 168 lie between the extremities of the bead formations 164. Beads may be formed all round the periphery of tear-open panel 162 adjacent to frangible element 156 or may be formed partly round it. Instead of being downwardly directed, the beads 164 can in an alternative example be upwardly formed.

When the tear-open panel is removed from the container by fracturing the frangible element 156 the surface of the panel bends slightly in a series of hinge-like movements across flat portions 168 along bend lines 170 (shown by dotted lines). In this manner the removing of tear-open panel is controlled by the successive bending at the bend lines 170 which avoids the risk of spilling the contents of the containers when these hold liquids or powders.

FIG. 12 shows a part cross-section through a sheet metal container which has been fitted with a lid consisting of a sheet metal member of the type illustrated in FIG. 11, the section being taken along one of the lines 170 of that figure. In order to fit the lid on the cylindrical wall 172 of the container the rim portion 157 of the lid has been folded into the top of the wall 172 forming a bead 174 at the top of the container.

A tab handle 176, shown in FIG. 13, has been riveted to the lid by means of a conventional boss type rivet 180 or by other suitable attachment means. The tab handle 176 is made of tinplate or other suitable material and has a nose portion 178 and a ring handle 182. To open the container the tab handle is lifted towards the rim of the lid causing nose portion 178 to penetrate the frangible element 156, breaking through this for a short distance each side of the nose portion 178 and bending a portion of the lid locally downwards into the container.

The tab handle 176 is next pulled upwardly, fracturing the frangible element 156 further round its periphery. As the tear-open panel 162 within the element 156 is being removed from the container its surface bends slightly in a series of hinge-like movements round bend lines 170 which form in the panel between successive pairs of beads 164 on opposite sides of the handle as seen in FIG. 13. In this manner the removal of tear-open panel 162 from the container is controlled by the successive bending at the bend line 170 which avoids the risk of spilling the contents as can happen when lids of known design are pulled from a container.

In FIG. 14 the sheet container wall 188 has a weakened line or frangible element 190, annular in plan, bounded on its outer side by an upward formation 192 and on its inner side by an upward formation 194. A series of upwardly formed beads 196 is located within the frangible element 190. These beads 196 are further from the frangible element 190 than are the beads in FIGS. 10 and 11, but are nevertheless close enough to allow flow of metal inwardly during formation of the frangible element, the beads being formed simultaneously therewith. The beads 196 have exactly the same function as those of FIGS. 10 and 11, that is to say, when the tear-open panel is torn out of the container, the surface of the panel bends slightly along bend lines 198.

FIG. 15 is a cross-section of the same container wall but showing the beads 196 in a position so closely adjacent the frangible element 190 that the upward formation 194, where it lies opposite a bead 196, leads directly into the outer surface of the bead in an exactly analogous manner to FIG. 11, except that the beads are upwards instead of downwards.

The series of beads in both arrangements is if necessary interrupted adjacent the tab handle or any other attached opening means employed for a sufficient distance to prevent any bead interfering with the due opening of the container.

It will be appreciated that the series of upwardly formed beads 196 shown in FIGS. 14 and 15 may be replaced by a single upwardly directed bead, equivalent to the bead 142 of FIG. 10 except that it has been upwardly instead of downwardly formed. FIG. 15 may equally be regarded as a cross-section through such a single upwardly formed bead.

Thinned portions in accordance with this invention may be made to completely surround the lid or wall of a container or a portion thereof in the form of a circle or other suitable closed figure, or, if desired, may only partly surround part or the whole of a lid which can then be bent away from or into the container after fracturing the thinned portion.

The fracturing need not be carried out by handle means and the method and apparatus of this invention are intended for use in the manufacture generally of frangible elements in container walls however these may be utilized.

What is claimed is:

1. Sheet material having a first portion, a rounded step in the top surface of the first portion of the sheet leading to a frangible element comprising material of smaller thickness than the first portion, a rounded formation in a surface of the sheet leading from the frangible element to a second portion of the sheet material, the second portion having a thickness greater than that of the frangible element and having formed therein at least one hollow indentation.

2. Sheet material according to claim 1 wherein the said formation is a rounded step.

3. Sheet material according to claim 2 wherein the two steps are in the same direction and are in opposite surfaces of the material.

4. Sheet material according to claim 1 wherein at least the parts of the first and second portions adjacent the frangible element are in parallel planes.

5. Sheet material according to claim 1 wherein the said rounded formation is a rounded formation in the opposite surface of the sheet from the rounded step and in the same direction as the step.

6. Sheet material according to claim 1 wherein the material is tinplate.

7. Sheet material according to claim 1 wherein [there] *at least one indentation* is a hollow bead in the second portion adjacent the rounded formation.

8. Sheet material according to claim 7 wherein there is a further indentation in the second portion more remote from the rounded formation.

9. Sheet material according to claim 1 wherein the material of the first and second portion is at least about three times thicker than the material of the frangible element.

10. Plated sheet material having a first portion, a rounded step in the top surface of the first portion of the sheet leading to a frangible element comprising material of smaller thickness than the first portion, a rounded formation in a surface of the sheet leading from the frangible element to a second portion of the sheet material, the second portion having a thickness greater than that of the frangible element and having formed therein at least one hollow indentation, the plating on the surface of the sheet material being unbroken in the region of the frangible element, the step and the rounded formation.

[11. A container wall formed of sheet metal having a thinned portion of a width greater than its thickness comprising a frangible element bounding a tear-open panel, an elongate deformation in the tear-open panel extending alongside and close to the thinned portion comprising substantially parallel curves in the two surfaces of the tear-open panel.]

[12. A container wall according to claim 11 wherein a handle is secured to the tear-open panel of the wall bounded by the thinned portion whereby said thinned portion may be ruptured and the tear-open panel lifted from the wall.]

[13. A container wall according to claim 12 formed of tinplate wherein the handle is hinged to allow initial downward puncture of the frangible element on lifting the handle.]

[14. Sheet material having a first portion, a downward formation in the top surface of the sheet leading to a frangible element comprising material of smaller thickness than the first portion, the downward formation in the bottom surface of the sheet leading from the frangible element to a second portion of the sheet material, the second portion having a thickness greater than that of the frangible element and having formed therein a hollow bead close to the frangible element.]

[15. Sheet material according to claim 14 wherein the first and second portions of the sheet material are of substantially uniform thickness and the frangible element has a thickness less than half that of the uniform thickness.]

[16. Sheet material according to claim 14 comprising a container wall wherein each downward formation forms a closed figure in the wall, one downward formation lying inwardly of the other and substantially parallel thereto, the downward formations bounding a frangible element of substantially constant width.]

[17. A container wall according to claim 16 wherein the width of the frangible element exceeds its thickness.]

18. [Sheet material according to claim 14] *Sheet material having a first portion, a downward formation in the top surface of the sheet leading to a frangible element comprising material of smaller thickness than the first portion, a downward formation in the bottom surface of the sheet leading from the frangible element to a second portion of the sheet material, the second portion having a thickness greater than that of the frangible element and having formed therein a hollow bead close to the frangible element*, wherein the downward formation in the top and bottom surfaces are both in the form of rounded steps, a portion of the sheet material between the steps constituting the frangible element, the material having a shoulder adjacent one of the steps on the opposite side thereof from the frangible element, the hollow bead in the sheet material being adjacent the other step on the side opposite from the frangible element.

19. [Sheet material according to claim 14] *Sheet material having a first portion, a downward formation in the top surface of the sheet leading to a frangible element comprising material of smaller thickness than the first portion, a downward formation in the bottom surface of the sheet leading from the frangible element to a second portion of the sheet material, the second portion having a thickness greater than that of the frangible element and having formed therein a hollow bead close to the frangible element*, wherein the downward formations in the top and bottom surfaces are both in the form of rounded steps.

[20. Sheet material according to claim 14 formed of tinplate.]

21. Sheet metal having a first portion, a downward formation in the top surface of the sheet leading to a frangible element comprising metal of smaller thickness than the first portion, a downward formation in the bottom surface of the sheet leading from the frangible element to a second portion of the sheet metal of thickness substantially the same as that of the first portion, an area of the second portion adjoining the thinned portion being planar except for a deformation there [-] in formed between substantially parallel curved depressions in the metal surfaces close to the thinned portion.

[22. Sheet material having a first portion, a downward formation in the top surface of the sheet leading to a frangible element comprising material of smaller thickness than the first portion, a second portion of thickness greater than that of the frangible element joining the frangible element on the other side from the first portion and a series of indentations in the second portion.]

[23. Sheet material according to claim 22 wherein a single elongate bead is provided in the second portion close to the frangible element and a series of indentations is provided in the second portion on the opposite side of the single bead from the frangible element.]

[24. Sheet material according to claim 23 wherein the frangible element is in the form of a continuous figure in the sheet, and the elongate bead is formed inwardly of and parallel to the frangible element.]

[25. Sheet material according to claim 23 wherein the said series is a series of beads parallel to the single elongate bead.]

[26. Sheet material according to claim 22 wherein a series of beads is formed close to the frangible element.]

[27. Sheet material according to claim 26 wherein the frangible element is in the form of a continuous figure in the sheet and the series of beads is formed inwardly of and parallel to the frangible element.]

[28. Sheet material according to claim 22 wherein the indentations are so arranged in the second portion that the sheet material has a plurality of substantially parallel lines of low resistance to flexing separated by areas of relatively high resistance to flexing.]

[29. A container wall formed of sheet material according to claim 22 wherein the sheet material may be bent along successive lines across the sheet between the indentations when the frangible element is broken through.]

[30. A container wall according to claim 29 having a pair of downward formations each in the form of a closed figure in the wall, one downward formation lying inwardly of the other and substantially parallel to it, the downward formations bounding a frangible element of substantially constant width defining a tear-open panel.]

*31. In an easy-opening container wall of metal sheet having top and bottom surfaces, the improvement comprising:*

*a tear-open panel portion;*

*a portion framing said tear-open panel portion;*

*an elongate frangible element formed in said container wall joining said framing and panel portions, said element revealed in cross section as having a region of reduced thickness relative to said framing and panel portions adapted to rupture when said panel is torn open and first and second concave surfaces respectively formed in said top and bottom sheet material surfaces and respectively joining said region to said framing and panel portions; and*

*at least one hollow protuberance in said container wall formed adjacent the frangible element so as to accommodate excess metal displaced as a result of the formation of the region of reduced thickness.*

*32. The improvement in a container wall according to claim 31 wherein said first and second concave surfaces in said top and bottom sheet material surfaces are laterally offset with respect to each other.*

*33. The improvement in a container wall according to claim 31 wherein the top and bottom surfaces of the said metal sheet are planar in the region of reduced thickness and, at their respective lateral edges remote from the respective concave surfaces adjoin respective coplanar surfaces of the panel and framing portions.*

*34. The improvement in a container wall according to claim 31 wherein at least one hollow protuberance is located in the panel portion.*

*35. The improvement in a container wall according to claim 31 wherein at least one hollow protuberance is an elongate hollow bead which extends beside the frangible element.*

*36. The improvement in a container wall according to claim 31 wherein the said region of reduced thickness has a thickness about one-third that of the general thickness of the said framing and panel portions.*

*37. The improvement in a container wall according to claim 31 wherein the framing and panel portions lie generally in different, parallel planes.*

*38. The improvement in a container wall according to claim 34 wherein the framing portion has a shoulder formed by a reverse fold in the sheet adjacent the frangible element.*

*39. The improvement in a container wall according to claim 31 wherein the metal sheet is tinplate.*

*40. The improvement in a container wall according to claim 31 further having a handle secured to the panel portion for use in tearing it open, the handle having a nose portion and being arranged to pivot so that the nose portion moves in a direction which is inwardly of the container, when the wall is part of a container, to cause initial rupture of the frangible element.*

*41. The improvement in a container wall according to claim 31 wherein the frangible element is continuous in the metal sheet.*

*42. The improvement in a container wall according to claim 31 further having a handle mounted on the panel portion for use in tearing the panel out, and wherein there are a plurality of said hollow protuberances in the panel portion in the form of elongate hollow beads each extending in its direction of elongation beside the frangible element with adjacent beads separated between their respective ends by gaps at which the sheet is substantially planar, the gaps being generally arranged in pairs, the two gaps of each pair being respectively to either side of a central line of the panel portion passing through the point of mounting of the handle so that there are provided in the panel portion, corresponding to the pairs of gaps, spaced lines of low resistance to flexing transverse to the said central line, separated by areas of relatively high resistance to flexing.*

* * * * *

UNITED STATES PATENT AND TRADEMARK OFFICE

CERTIFICATE OF CORRECTION

PATENT NO. : Re. 28,776

DATED : April 20, 1976

INVENTOR(S) : William Cookson

It is certified that error appears in the above-identified patent and that said Letters Patent are hereby corrected as shown below:

Title page, Article 30, delete "Jan.22, 1970 Australia...10545/70"

Title page, Article 30, delete "Dec. 7, 1973 Germany.....2360982"

Signed and Sealed this

Twentieth Day of July 1976

[SEAL]

*Attest:*

RUTH C. MASON
*Attesting Officer*

C. MARSHALL DANN
*Commissioner of Patents and Trademarks*